United States Patent
Gresch et al.

(10) Patent No.: US 11,154,018 B2
(45) Date of Patent: Oct. 26, 2021

(54) METHOD FOR OPTIMIZING AN OPERATING PARAMETER OF A MACHINE FOR APPLICATION OF AGRICULTURAL MATERIAL TO A FIELD AND A CORRESPONDING MACHINE

(71) Applicant: Deere & Company, Moline, IL (US)

(72) Inventors: Valentin Gresch, Kaiserslautern (DE); Martin Kremmer, Mannheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/669,862

(22) Filed: Aug. 4, 2017

(65) Prior Publication Data
US 2018/0035622 A1 Feb. 8, 2018

(30) Foreign Application Priority Data
Aug. 5, 2016 (DE) .......................... 102016214554.1

(51) Int. Cl.
A01G 25/16 (2006.01)
A01B 79/02 (2006.01)
A01C 21/00 (2006.01)
A01G 22/00 (2018.01)

(52) U.S. Cl.
CPC .............. *A01G 25/16* (2013.01); *A01B 79/02* (2013.01); *A01G 22/00* (2018.02); *A01C 21/005* (2013.01); *G05B 2219/2625* (2013.01)

(58) Field of Classification Search
CPC ................................ A01G 25/16; A01G 22/00
See application file for complete search history.

(56) References Cited

U.S. PATENT DOCUMENTS

| 2001/0016788 A1* | 8/2001 | Hauwiller | A01B 79/005 700/283 |
| 2010/0071092 A1* | 3/2010 | Carter | C12N 15/827 800/285 |
| 2012/0101861 A1* | 4/2012 | Lindores | G06Q 10/06 705/7.11 |
| 2014/0303854 A1* | 10/2014 | Zielke | A01C 21/00 701/50 |

(Continued)

FOREIGN PATENT DOCUMENTS

| DE | 19528663 A1 * | 2/1997 | .......... A01B 79/005 |
| DE | 19528663 A1 | 2/1997 | |

(Continued)

OTHER PUBLICATIONS

Definition of Field taken from online version of Merriam-Webster. Retrieved Jun. 28, 2019. <URL https://www.merriam-webster.com/dictionary/field> (Year: 2019).*

(Continued)

*Primary Examiner* — Kenneth M Lo
*Assistant Examiner* — Jonathan Michael Skrzycki
(74) *Attorney, Agent, or Firm* — Hanley, Flight & Zimmerman, LLC

(57) ABSTRACT

A computer unit calculates an operating parameter for a machine for application of agricultural material to a field using data concerning a plant growth affecting property of the location to be supplied with the material and data concerning the property and/or an operating parameter of the machine derived therefrom for an adjacent location in the field in the sense of an optimization of a horticultural result.

21 Claims, 2 Drawing Sheets

(56) References Cited

U.S. PATENT DOCUMENTS

2014/0379228 A1* 12/2014 Batcheller ............ A01C 21/005
                                                                          701/50
2015/0066932 A1    3/2015 Stuber et al.
2016/0309659 A1* 10/2016 Guy ........................ A01G 7/00

FOREIGN PATENT DOCUMENTS

| DE | 19532870 A1 | 3/1997 |
| DE | 19844395 A1 | 3/2000 |
| DE | 102006014703 | 10/2007 |
| DE | 102006014703 A1 | 10/2007 |
| EP | 2636292 A1 | 9/2013 |
| WO | 2012007549 A1 | 1/2012 |
| WO | 2014026183 A2 | 2/2014 |

OTHER PUBLICATIONS

European Search Report issued in counterpart application No. 17184246.1 dated Dec. 1, 2017. (9 pages).

\* cited by examiner

METHOD FOR OPTIMIZING AN OPERATING PARAMETER OF A MACHINE FOR APPLICATION OF AGRICULTURAL MATERIAL TO A FIELD AND A CORRESPONDING MACHINE

RELATED APPLICATIONS

This document claims priority based on German Patent Application No. 102016214554.1, filed on Aug. 5, 2016, which is hereby incorporated by reference into this application.

FIELD OF THE INVENTION

The invention concerns a method for optimizing an operating parameter of a machine for application of agricultural material to a field and a corresponding machine.

BACKGROUND

One aim of precision agriculture is to achieve a best possible result in growing plants with means at hand. One therefore seeks to optimize the operating parameters such as sowing depths, spacings, seed varieties, type of fertilizer, application rates, in planting, fertilizing, spraying, etc., based on previously obtained data, said parameters being determined before or during the work operation by sensors or other methods and concern, for example, the soil type, soil moisture, field topology, type of plant and crop condition.

Generally, if sufficiently accurate data are known on a sufficiently fine grid before the work operation, an electronic map is first drawn up, in which site-specific, optimized values for the operating parameters are plotted. This map is transmitted to an onboard computer of a work machine, which automatically adjusts an actuator in a position-specific way by means of the value given by the map. As an example, German Patent Application No. DE 195 32 870 A1 proposes to create a map with optimum placement depths for the seed via the nutrient availability, soil stability, and soil type of a field, and when sowing, to adjust the sowing depths via the precalculated placement depths. If the adjustment values change in the forward direction, a stepwise or stepless (smooth) transition is made. Also, different adjustment values for partial working widths can be provided in the transverse direction.

German Patent Application No. DE 198 44 395 A1 describes a similar procedure, in which sowing depths that are to be set are calculated before a sowing operation by means of a map of the soil moisture and soil type and a weather prediction and sent to the seeding machine. In another embodiment, the soil moisture can be measured directly during the sowing operation and used to specify the sowing depth.

If a map with data for the entire field already exists before the work operation, it is possible to calculate the adjustment values ahead of time and (for example in the form of the smoothing in accordance with German Patent Application No. DE 195 32 870 A1) also to take into account data of a specific position of adjacent locations in the field, which can have certain advantages in the form of smoothing, since, for example, measurement errors or outliers are averaged in the determination of the data, and also difficult abrupt adjustments of adjustment values do not arise.

However, if the data are first measured during the work operation, no data is available during the first pass across the field, apart from data captured from locations already traversed. This is why only the data pertinent to the relevant locations or at most the data measured immediately prior would be used to determine the adjustment values. In a second pass, in which data from a previously traversed, parallel pass exist, there is the possibility of utilizing the data of the previously traversed pass for predictive control of the machine, since one can assume that the data change significantly only over relatively large distances. In this regard, it is proposed in German Patent Application No. DE 195 28 663 A1, to include a predictive calculation of yield values by means of yield measurement points from already harvested adjacent rows, the position of which lie within a specific radius from the combine harvester. In this case, the yield average can be determined or a gradient process can be used, i.e., closer points are given greater weight in the determination. For this, International Publication No. WO 2012/007549 A1 proposes to make available a model of the field and to optimize a cost function of the difference between a model value of the field and the first and second derivatives of measurement values obtained at adjacent locations. Thus, according to the two documents mentioned, the data of adjacent locations are taken into account in order to predictively determine adjustment values for a position lying immediately in front of the machine. This procedure can be used for the automatic adjustment of harvesting machines, or with other mobile work machines, with which an inhomogeneous area is to be worked in a specific way over partial areas, as for example in plowing or spreading fertilizer.

The procedures according to German Patent Application No. DE 195 28 663 A1 or International Publication No. WO 2012/007549 A1 are suitable, only for applications in which the operation carried out at a specific location does not have any kind of effect on the operation other than said location, since, for a specific location in the field, it basically does not make any difference whether the adjacent locations, with different parameters, have been harvested or plowed.

On the other hand, the situation is different when sowing, since the seed depth and other sowing parameters such as the seed spacing affect the planting operation to a large degree. If plants have been sown with very good sowing parameters on a specific location in the field, they will emerge there faster than plants sown on adjacent locations with less favorable sowing parameters. Over the crop cycle, this results in plants sown with less favorable sowing parameters remaining considerably smaller or even dying, since the adjacent plants sown with better sowing parameters grow faster and rob them of light, water, and nutrients. Similar problems can arise when specific locations in a field are fertilized more than other locations and the plants growing there become much larger than the plants growing on the adjacent less fertilized locations and take light, water, and nutrients from the latter. The invention has as its aim the avoidance or at least reduction of said disadvantages.

SUMMARY

A method for optimizing an operating parameter of a machine for application of agricultural material to a field comprises the step of calculating an operating parameter for the machine in the application of the material to a location in the field through an electronic computer unit, the computing unit identifies data concerning the property that affects plant growth of the location to be provided with the material and data concerning the plant growth affecting property and/or concerning an operating parameter of the machine derived therefrom for an adjacent location in the field that is to be provided with the material, with the goal of an optimization of a horticultural result.

A method for optimizing the application of agricultural material with a machine to a location in a field is provided. The method includes identifying, with a computing element, first data associated with a plant growth affecting property for a location adjacent to the location in the field to be supplied with the agricultural material. The method further includes identifying, with the computing element, second data associated with an operating parameter of the machine for a location adjacent to the location in the field to be supplied with the agricultural material. The method also includes identifying with the computing element, third data associated with a plant growth affecting property data for the location in the field to be supplied with the agricultural material. The method further yet includes calculating, with the computing element, expected plant growth data based on the first, second or third data; and calculating, with the computing element, an operating parameter of the machine for the location to be supplied with the agricultural material, wherein the operating parameter of the machine is adjusted to optimize the expected plant growth for the location to be supplied with the agricultural material.

BRIEF DESCRIPTION OF THE DRAWINGS

The figures show an embodiment example of the invention, which is described in more detail below. Here.

DETAILED DESCRIPTION

Figure 1:
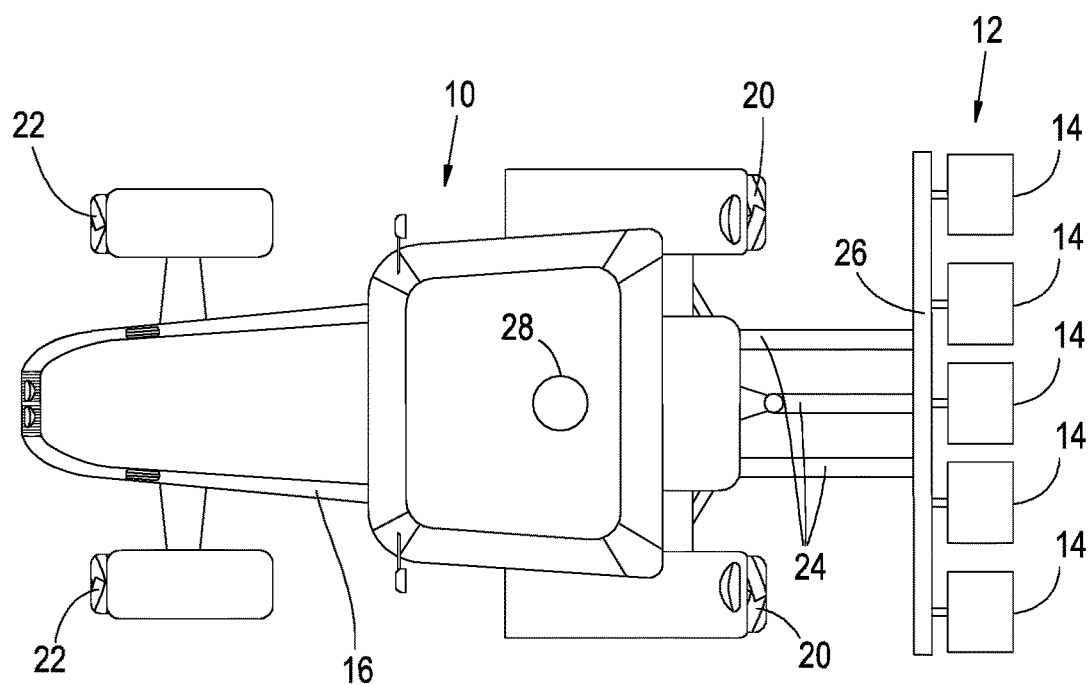
FIG. 1 shows a top view of a tractor with a seeding machine attached to it.

In other words, for a specific location in a field, an operating parameter for a machine for application of agricultural material (such as seeds or fertilizer or chemicals) is calculated by a computer unit. The computer unit has data concerning at least one plant growth affecting property of the specific location in the field, for which an operating parameter is to be calculated, and concerning a location adjacent to the specific location and/or an operating parameter derived therefrom. The computer unit thus knows what plant growth affecting property is present on the adjacent location and/or what operating parameter of the machine has been used there or is supposed to be used there. Thus, it can also calculate an (expected) plant growth on the adjacent location and optimize the operating parameter for the specific location in the field so that an optimum horticultural result is obtained.

If, for example, the computer unit calculates, by means of the plant growth affecting property and the operating parameter envisioned there, that the plants at the adjacent location will emerge in 17 days and 3 hours, it can establish the operating parameter at the specific location so that the plants also emerge there at exactly the same time point, possibly while taking into account the different points in time at which the seeds are put in the ground. In doing so, the plant growth affecting properties of the relevant location, which can deviate more or less from those of the adjacent location, are also taken into account. Analogously, it can be calculated by means of a fertilizer result on the adjacent location how strongly the plants that are there will probably grow in a specific time period (for example, up to the next application of fertilizer) and enough fertilizer will be put on the relevant location so that the plants growing there will be just as large as those on the adjacent locations. In addition, by means of information on the plant growth affecting property, (which can, for example, be the soil quality and/or the soil humidity and/or the soil topography and/or the soil nutrient content) one can switch between several seed varieties. For example, in a soil zone with ideal conditions, a very high-yield seed variety can be sown, and in soil zones with poor conditions, a lower-yield but more robust seed variety can be sown.

Said optimization of the horticultural result need not unconditionally mean that the plants are supposed to grow as big as possible, rather, a cost and profit optimization can be had in a sophisticated variant, i.e., what the costs for seed, fuel, fertilizer, and/or work hours are and what price will be obtained for the plants or the products produced from them is taken into account and an economic optimum is achieved via all aspects.

The computer unit can calculate the operating parameter by means of a plant growth model, which can be relatively simple and, for example, establish the sowing depth only by means of the soil moisture. In such a model, the soil moisture of the adjacent location is taken into account, and if there are changes of the soil moisture, a gradual transition of the sowing depth is generated. However, a model as complex as one likes can also be used, one that takes into consideration a large number of soil parameters, the topology of the field, various plant parameters, and/or weather forecasts.

As already mentioned, the computer unit can calculate the operating parameter in the meaning of as uniform as possible emergence and/or growth of the plants.

In one possible embodiment, the calculation of the operating parameter takes place ahead of time in the planning of an application operation for an entire field through existing data for the field concerning the plant growth affecting properties. Accordingly, there is a map of the field with the plant growth affecting properties, by means of which a production plan is created.

In another embodiment, the calculation of the operating parameter takes place during the application operation on a field. The data concerning the plant growth affecting properties are determined in this case by means of a sensor during the application operation, and the data for the adjacent location have already been determined in a prior pass over the field. It can be provided in this embodiment that, during a first pass over the field along a first course, the operating parameter of the machine (for lack of previously registered data for the adjacent locations in the field) is determined by the computer unit only by means of the plant growth affecting properties that are determined by the sensor, and the computer unit takes into account the plant growth affecting properties and/or operating parameters determined on the first pass in a second pass of the location in the field adjacent to the first pass.

The operating parameter determined by the computer unit can be automatically adjusted by an actuator on the machine, optionally after an operator confirmation, or by the operator.

The machine can comprise a plurality of devices distributed over its width and separately controllable by an actuator, devices that are controlled by the computer unit separately and possibly differently from each other.

FIG. 1 shows a top view of a combination of a tractor 10 and a seeding machine 12 attached to it with a number of row units 14 distributed over the width of the implement 12 for placing seeds in the earth, although any other type of seeding machines 12 can be used. The row units 14 can lie in a line, as shown, or can be affixed offset from each other in the forward direction. The tractor 10 comprises a chassis 16 with rear drive wheels 20 and front, steerable wheels 22. A tool frame 26 extending horizontally and transverse to the forward direction of the tractor 10, which runs from right to left in FIG. 1, is hooked to a three-point hitch 24 attached to chassis 16, with upper and lower link arms. The tool frame 26 holds the row units 14 of the seeding machine 12. The seeding machine 12 could also be attached to tractor 12 in any other way, for example sitting on a vehicle frame and pulled via a drawbar. The seeding machine 12 could also be designed as a pneumatic seeding machine. A position reckoning device 28 based on the reception of satellite signals (GPS, Galileo and/or Glonass, and possibly a local correction signal) is attached to the roof of the tractor 10.

Figure 2:
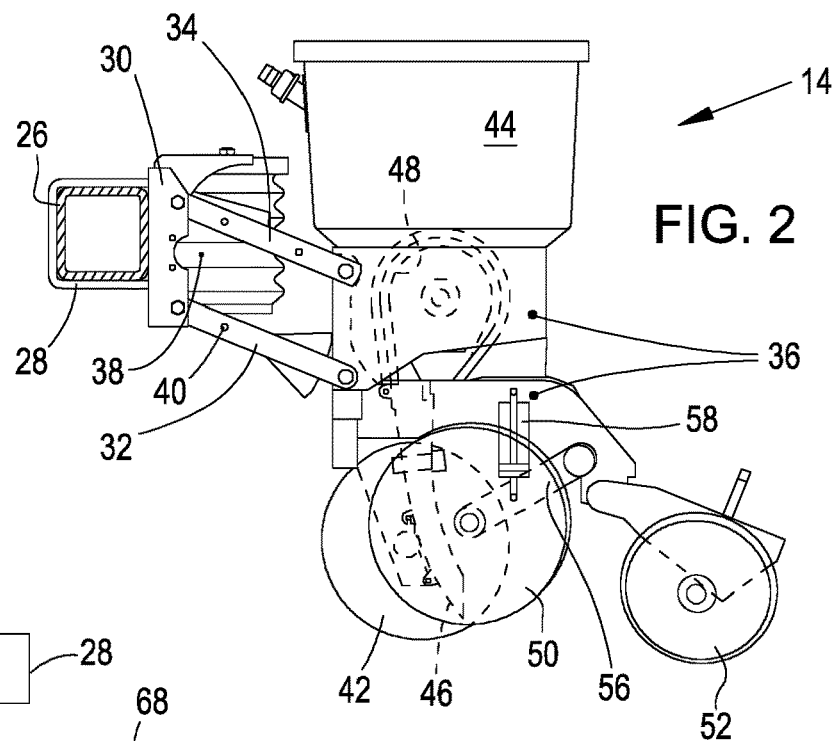
FIG. 2 shows a side view of a computer unit of the seeding machine.

FIG. 2 shows a row unit 14 of the seeding machine 12. The row unit 14 is attached to the tool frame 26 via U-shaped brackets 28, which are joined to a console 30, which extends vertically at the rear of the tool frame 26 and to which two link arms 32, 34 are hinged one above the other, the link arms also being hinged to a frame 36 of the row unit 14. The link arms 32, 34, together with the console 30 and frame 36, form an adjustable parallelogram, which defines the height of the frame 36 over the soil. A pneumatic actuator 38, which serves as a tensioning means and which is shown in this embodiment as a bellows, engages the console 30 at the top on the one hand and the lower link arm 32 below on the other hand (at point 40) and defines the position of the frame 36 and the pressure with which a furrow opener 42 mounted on the frame 36 interacts with the soil.

The frame 36 carries, in a substantially known way, a seed holder 44, a seed tube 46, and a measuring device 48 (in particular a pneumatic measuring device, operating with reduced pressure provided with a blower, which is not shown), which gradually deposits individual seeds form the seed holder 44 into the seed tube 46, which places the seed in a furrow, which was produced by the furrow opener 42, whose operating depth is preset by a gauge wheel 50. The furrow is closed by a closing wheel 52. The vertical position of one of the swing arms 56 that holds the gauge wheel 50 and thus the depth of the furrow in which the seed is placed is determined by an actuator 58. A feedback sensor, not shown, can register the current sowing depth.

Figure 3:
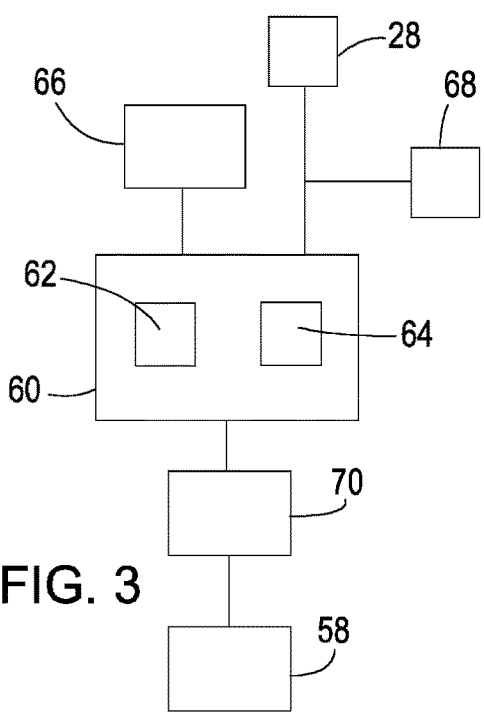
FIG. 3 shows a schematic diagram of a computer unit for control of the row units.

FIG. 3 shows a computer unit 60, which serves to control the seeding machine 12. The computer unit 60 comprises a processor 62 and a memory 64, which has a read-only and a read/write part. The computer 60 is connected to a sensor 66, an operator interface 68 with display and input means, which is situated in the cabin of the tractor 10, and the position reckoning device 28. In addition, the computer unit 60 is connected to a control unit 70, which controls all actuators 58 separately from each other, on the basis of signals from said feedback sensors. The sensor 66 can register any property of the field that affects plant growth, for example the soil moisture. A single sensor 66 can be mounted on the tractor 10 or on the seeding machine 12 (in particular centrally) or a plurality of sensors 66 can be distributed over the operating width of the seeding machine 12, for example to each sowing unit 14.

Figure 5:
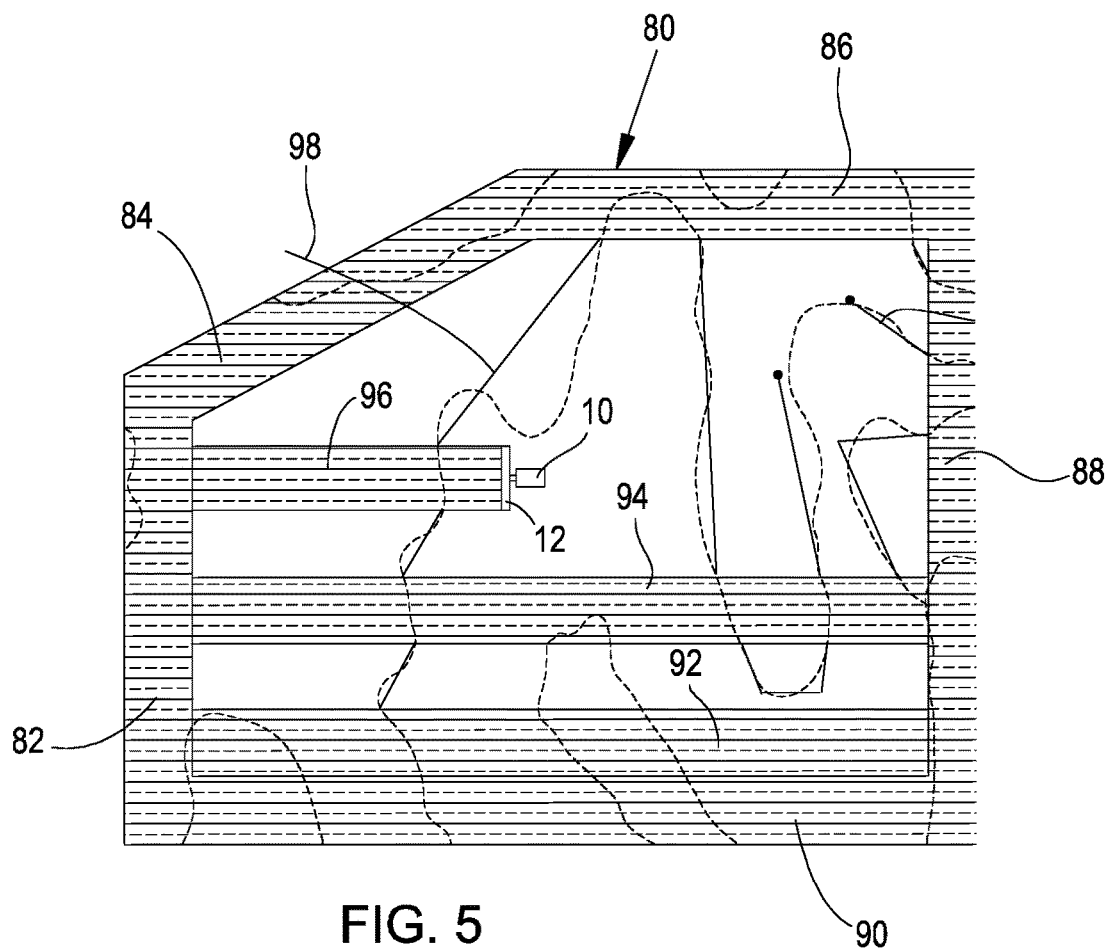
FIG. 5 shows an example of a field with a seeding machine operating on it.
Figure 4:
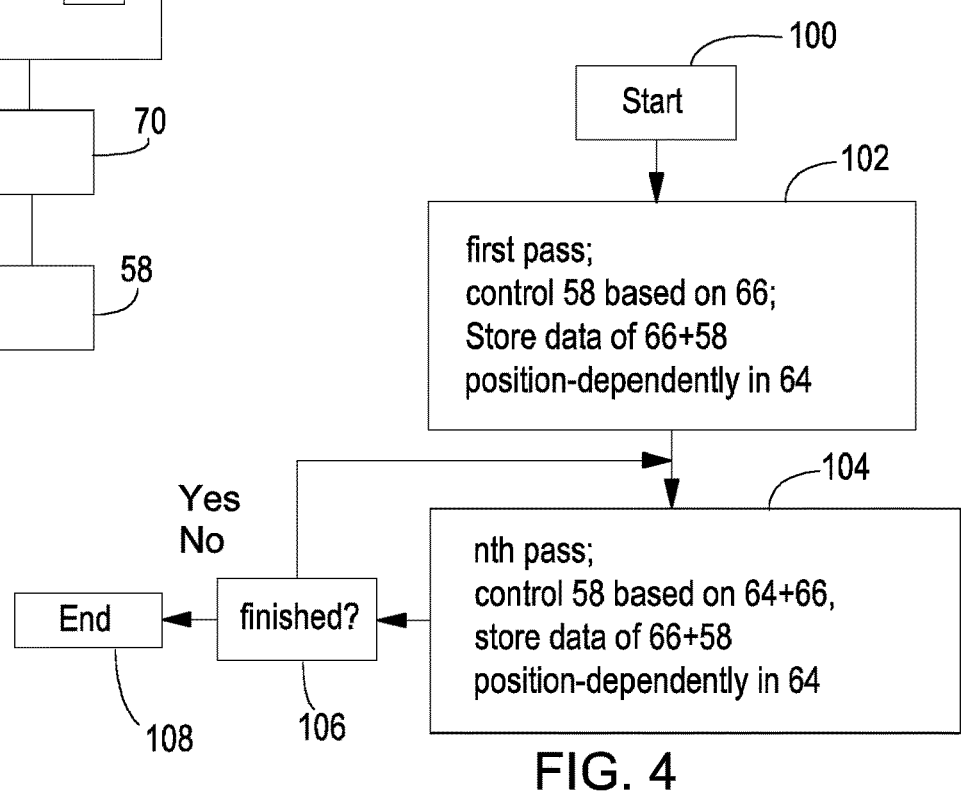
FIG. 4 shows a flowchart for a procedure according to which the computer unit can operate.

FIG. 4 shows a flowchart according to which the computer unit 60 operates when sowing a field 80, as is shown as an example in FIG. 5. After the start in step 100, in which the computer unit 60 is initialized, step 102 follows, in which a first pass over the field 80 is carried out. This pass can, as shown in FIG. 5, consist of a trip around the field edge by means of partial courses 82 to 90. During this first pass, the sensor 66 registers a plant growth affecting property of the traversed locations in the field, namely the moisture. The actuators 58 are controlled by means of the species to be sown and the registered plant growth affecting property of the traversed locations (known to the computer unit 60, for example, by means of an operator input via the operator interface 68). If only a single sensor 66 is present, all actuators 58 are controlled alike for lack of other data, while they could also be controlled differently in correspondence with the local property if a plurality of sensors is distributed over the working width of the seeding machine 12. The signals of the sensor or sensors 66 and the pertinent position registered by means of the position reckoning unit 28, and the adjustment values of the actuators 58 (i.e., the sowing depth) are stored in memory 64 after set travel distances (for example, every 1 m) or periods of time (for example, every 0.5 sec). Accordingly, a map of the field 80 with the locally detected plant growth affecting properties and the operating parameters of the actuators 58 is gradually created in memory 64.

Then follows step 104, in which a second, third, or nth (with n>1) pass over the field 80 takes place, as indicated by the reference numbers 92 to 96, in which the field is traversed in parallel partial courses, which run parallel to the field edges shown below in FIG. 5 and the partial courses 90 covered there, and in each case are offset from each other by two working widths, in order to simplify the turning operation in the field edges defined by the partial courses 82, 88. The yet unworked partial courses are worked later. In this step 104, the computer unit 60 controls the actuators 58 not only by means of the plant growth affecting property of the relevant location locally registered there by the sensor or sensors 66, rather it takes into account one or more plant growth affecting properties of adjacent locations in the field 80 that were registered previously by sensor or sensors 66. In the case where the currently traversed partial course 92 lies exactly next to a previously traversed partial course 90, the operating parameters for actuators 58 used on the adjacent partial course 90 and/or the plant growth affecting property of the adjacent location locally registered by sensor 66 or sensors 66 that underlies said parameter are taken into account in order to determine a plant growth model whenever the plants emerge on the adjacent location. By means of said time point and the plant growth affecting property of the relevant location in the partial course 92 registered locally by sensor(s) 66 and, optionally, to improve the accuracy and to avoid outliers, some previous measurement values of the partial course 92 and the adjacent region of the partial course 90, which can be at a distance having a radius of, for example, 10 or 20 m, a calculation is made how deep the seed material is to be placed at the relevant location in order to achieve as accurately as possible the emergence of the just sown plants at the same time. The actuators 58 are correspondingly controlled and the signals of the sensor or sensors 66 and the pertinent position registered by means of the position reckoning device 28, and the adjustment values of the actuators 58 (i.e., the sowing depth) are stored in memory 64 in step 104 similar to step 102 after established travel distances (for example, every 1 m) or periods of time (for example, every 0.5 sec).

In step 104, if no immediately adjacent, previously traversed partial course exists, as is the case in partial courses 94 and 96, one can either fall back on the local sensors 66 as in step 102, in order to establish the operating parameters of the actuators 58, or, by analogy with step 104, one can use the data concerning the plant growth affecting factor and/or a resulting operating parameter from the already tested locations in the field that are the closest. In the case of the partial course 94, this would first be partial course 82, then the partial course 92, and finally the partial course 88. If more or less abrupt changes in the property registered by the sensor 66 are established in the previous partial courses, said property can be extrapolated to other partial courses, as shown by means of the boundary 98, which represents a change in the soil moisture or another property. Said boundary 98 can be recognized on the partial courses 82, 90 and 92 in each case in partial segments, and can be extrapolated by the computer unit 60, so that the partial segments are completed, as shown in FIG. 5. The extrapolated boundary 98 can be taken into consideration on partial courses 94 and 96.

Next follows step 106, in which it is asked if the entire field 80 has been worked. If this is not the case, step 104 is repeated, and otherwise the operation is ended in step 108.

The plant growth model stored in memory 64 can be relatively simple and merely imply how deep the seed should be placed as a function of the soil moisture and when it will emerge. An improvement of the horticultural result over the entire field 80 can already be achieved with this simple model, since, on the partial course 92, the computer unit 60 already has data about how deep the seed was placed in the soil on the adjacent partial course 90. The plant growth model will select, on the partial course 92, the sowing depth of the sowing unit 14 immediately adjacent to partial course 90 to be the same as the sowing depth on the partial course 90 (or at least for one of the sowing units 14, which operated immediately next to partial course 92, if the sowing depths are different over the width of the seeding machine 12), when the properties are the same over each of the partial courses 90, 92. If the properties are different, the sowing depth, however, is not determined just by means of the local property, but rather also by means of the adjacent sowing depth so that all plants emerge at the same time as far as is possible. If the properties of adjacent partial courses are different in the transverse direction and/or the properties change in the direction of travel when traveling over a partial course, a gradual transition of the sowing depth is achieved in this way not only in the forward direction of the seeding machine 12, but also in the transverse direction.

A more elaborate plant growth model can take into account one or more of the following properties that affect plant growth: measurement values of a sensor system for measuring soil parameters (for example, soil temperature, humidity, texture, density), where the sensor can be mounted on the seeding machine 12 or be stationary (inserted in the soil) and communicate with the seeding machine wirelessly, as well as georeferenced soil parameters, which are plotted on a map (for example, topography, soil zones, soil types and/or other agronomically relevant data such as last year's yield, crop rotation, fertilization) and which can be transmitted to the computer device 60 by means of a communication device.

The actuator 58 need not control only the sowing depth, rather, it can alternatively or additionally also control one of the following parameters: a mechanism and actuator to switch from a first seed type to a second seed type, in particular based on evaluations of the soil properties, the pressure of the actuator 38, its pressure reserve, and the plowshare pressure; the target population (seed spacing), the reduced pressure for separating seeds, the adjustment of the seed separating mechanism, threshold values for variation coefficients, double placements, missed placements, and travel dynamics, the travel speed, the fertilizer rate of fertilizer applied along with sowing, the placement depth or placement position of fertilizer relative to the seed and the air pressure of the tires of the tractor 10 and other machine implements.

Having described one or more embodiments, it will become apparent that various modifications can be made without departing from the scope of the invention as defined in the accompanying claims. Further embodiments of the invention may include any combination of features from one or more dependent claims, and such features may be incorporated, collectively or separately, into any independent claim.

The following is claimed:

1. A method for optimizing a machine for an application operation of an agricultural material, the method comprising:
    identifying first data concerning a plant growth affecting property and a first operating parameter of the machine for a first portion of a field adjacent to a second portion of the field during the application operation of the agricultural material at a first period of time;
    determining, during the first period of time, an expected horticultural result for the first portion of the field at a second period of time based on the first data concerning the plant growth affecting property and the first operating parameter of the machine, the expected horticultural result corresponding to at least one of: a uniform emergence of seed material placed in portions of the field during different periods of time, or a profit measure corresponding to costs associated with seed, fuel, fertilizer or work hours to achieve the expected horticultural result;
    identifying second data concerning a plant growth affecting property for the second portion of the field with a sensor during the application operation of the agricultural material at a third period of time after the first period of time; and
    determining a second operating parameter for the machine in application of the agricultural material to the second portion of the field to achieve the expected horticultural result for the first portion of the field at the second portion of the field at the second period of time.

2. The method of claim 1, wherein determining the second operating parameter further comprises generating data from a plant growth model.

3. The method of claim 2, wherein determining the second operating parameter further comprises determining an emergence date or growth stage of plants in the second portion of the field.

4. The method of claim 1, wherein determining the second operating parameter occurs prior to the application operation of the agricultural material to the first and the second portion of the field by identifying existing data already present for the first portion of the field and the second portion of the field concerning the plant growth affecting property.

5. The method of claim 1, further comprising a first application operation over the first portion of the field and a second application operation on the second portion of the field adjacent to the first application operation, wherein during first application operation an operating parameter of the machine is determined by a computer unit with the sensor determining the plant growth affecting property, and wherein during the second application operation the computer unit takes into account the plant growth affecting properties and operating parameters determined in the first application operation.

6. The method of claim 1, further comprising automatically adjusting the second operating parameter on the machine.

7. The method of claim 1, wherein the machine is a seeding machine and the second operating parameter comprises sowing depth.

8. The method of claim 1, wherein the machine comprises a plurality of devices that are distributed over its width and separately controllable by an actuator, the devices being separately and optionally differently controlled by a computer unit.

9. An apparatus for application of agricultural material, the apparatus comprising:
a machine for application of agricultural material to a field;
a sensor for generating data concerning first plant growth affecting properties for a first field portion at a first time period, the sensor to generate data concerning second plant growth affecting properties of a second field portion, the second field portion adjacent the first field portion and to be provided with the agricultural material at a second time period, the second time period occurring after the first time period;
a computer unit associated with the machine and programmed to:
identify a first operating parameter for the machine in application of the agricultural material for the first field portion during the first time period, the first operating parameter identified to achieve an expected horticultural result at a future time period, the future time period occurring after the second time period, the expected horticultural result corresponding to a uniform emergence of seed material placed in portions of the field during different periods of time, or a profit measure corresponding to costs associated with seed, fuel, fertilizer or work hours to achieve the expected horticultural result; and
determine a second operating parameter for the machine in application of the agricultural material on the second field portion based on data generated by the sensor during the first time period in application of the agricultural material for the first field portion, third data generated by the sensor during the first time period at the first field portion, and the first operating parameter of the machine, the second operating parameter determined to achieve the expected horticultural result of the first field portion at the second field portion at the future time period.

10. A method for optimizing an application of an agricultural material with a machine, the method comprising:
identifying, with a computing element, first data associated with a plant growth affecting property for a first location in a field during a first period of time, the first location adjacent to a second location in the field, the second location in the field to be supplied with the agricultural material at a second period of time, the second period of time occurring after the first period of time;
identifying, with the computing element, second data associated with a first operating parameter of the machine for the first location during the first period of time;
identifying, with the computing element, third data associated with plant growth affecting property data for the first location in the field during the application of the agricultural material to the first location at the second period of time;
calculating, with the computing element, an expected plant growth based on the first, second, or third data for the first location in the field for a third period of time, the expected plant growth corresponding to a uniform emergence of seed material placed in portions of the field during different periods of time, or a profit measure corresponding to costs associated with seed, fuel, fertilizer or work hours to achieve the expected plant growth; and calculating, with the computing element, a second operating parameter of the machine for the second location utilizing the first, second, and third data, wherein the second operating parameter of the machine is adjusted to achieve the expected plant growth for the first location at the second location during the third period of time, the third period of time occurring after the second period of time.

11. The method of claim 10, wherein the first and second data are generated from locations closest to the second location to be supplied with the agricultural material.

12. The method of claim 11, wherein the locations are previously traversed and immediately adjacent to the second location to be supplied with the agricultural material.

13. The method of claim 10, further comprising:
storing in memory of the computing element a plant growth model;
generating, with the computing element, expected plant growth data using the plant growth model; and
calculating the first and second operating parameters of the machine, based on the expected plant growth data.

14. The method of claim 13, wherein the expected plant growth data comprises data generated by the plant growth model for the second location in the field to be supplied with the agricultural material and the first location adjacent to the second location to be supplied with the agricultural material.

15. The method of claim 14, wherein the data associated with the expected plant growth comprises data relating to economic data, plant emergence date, plant growth stage, planting date, seed population, soil quality, soil topography, soil moisture or soil nutrient content, hydrology, topology, seed traits, historical weather or weather forecasts.

16. The method of claim 15, wherein the economic data is associated with at least one of seed cost, cost per seed, fertilizer cost, fuel cost and labor cost.

17. The method of claim 10, wherein the machine is at least one of a tractor, a planter, a harvester, a sprayer, an irrigation system, and a soil working system.

18. The method of claim 10, further comprising the steps of gathering information pertaining to a plant growth affecting property with a sensor and generating data associated with the gathered information.

19. The method of claim 18, wherein the gathered information pertaining to a plant growth affecting property includes at least one of soil quality, soil nutrient content, soil moisture or soil topography.

20. The method of claim 18, further comprising the step of creating a map of gathered information pertaining to plant growth affecting properties and operating parameters for locations in the field.

21. The method of claim 10, wherein the first operating parameter is to control an actuator, the actuator controlling at least one of planting depth, seed type for a multiple hybrid planter, seed meter operation, travel speed, fertilizer application rate, depth or position of a fertilizer applicator, air pressure of tires or plowshare pressure.

\* \* \* \* \*